(12) United States Patent
Huang

(10) Patent No.: US 6,741,403 B2
(45) Date of Patent: May 25, 2004

(54) HYBRID LENS SYSTEM

(75) Inventor: Yeo-Chih Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 10/158,487

(22) Filed: May 31, 2002

(65) Prior Publication Data

US 2003/0223129 A1 Dec. 4, 2003

(51) Int. Cl.[7] .................................................. G02B 9/14
(52) U.S. Cl. ........................ 359/785; 359/716; 359/790
(58) Field of Search .......................... 359/790, 784–788, 359/708, 716, 742, 735, 786, 787

(56) References Cited

U.S. PATENT DOCUMENTS

| 5,691,847 | A | * | 11/1997 | Chen | 359/656 |
| 5,768,030 | A | * | 6/1998 | Estelle et al. | 359/691 |
| 5,886,825 | A | * | 3/1999 | Bietry | 359/645 |
| 6,028,711 | A | * | 2/2000 | Adachi | 359/642 |
| 6,097,547 | A | * | 8/2000 | Ogata et al. | 359/673 |
| 6,101,035 | A | * | 8/2000 | Maruyama | 359/565 |
| 6,147,816 | A | * | 11/2000 | Ori | 359/794 |
| 6,317,276 | B1 | * | 11/2001 | Braat | 359/785 |
| 6,373,640 | B1 | * | 4/2002 | Betensky et al. | 359/689 |
| 6,490,102 | B1 | * | 12/2002 | Huang | 359/785 |
| 6,529,336 | B1 | * | 3/2003 | Kreitzer | 359/649 |

\* cited by examiner

Primary Examiner—Scott J. Sugarman
Assistant Examiner—Deborah A. Raizen
(74) Attorney, Agent, or Firm—Charles E. Baxley

(57) ABSTRACT

A lens system includes a plastic positive lens, a plastic negative lens and a glass positive lens. The plastic lenses are made to be meniscus lenses and an aspheric surface and a diffractive surface are respectively mounted onto the plastic lenses so as to have better image with low manufacturing cost.

9 Claims, 10 Drawing Sheets

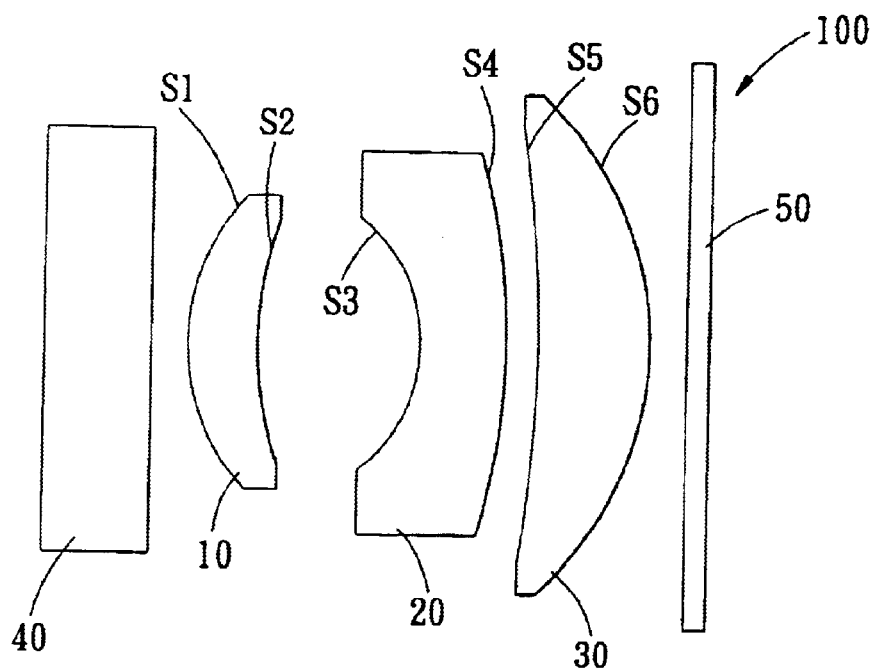
F I G. 1
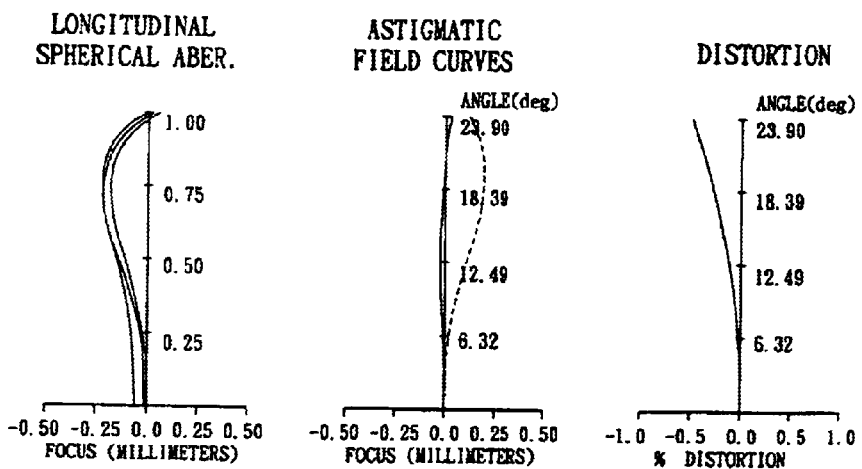
F I G. 2

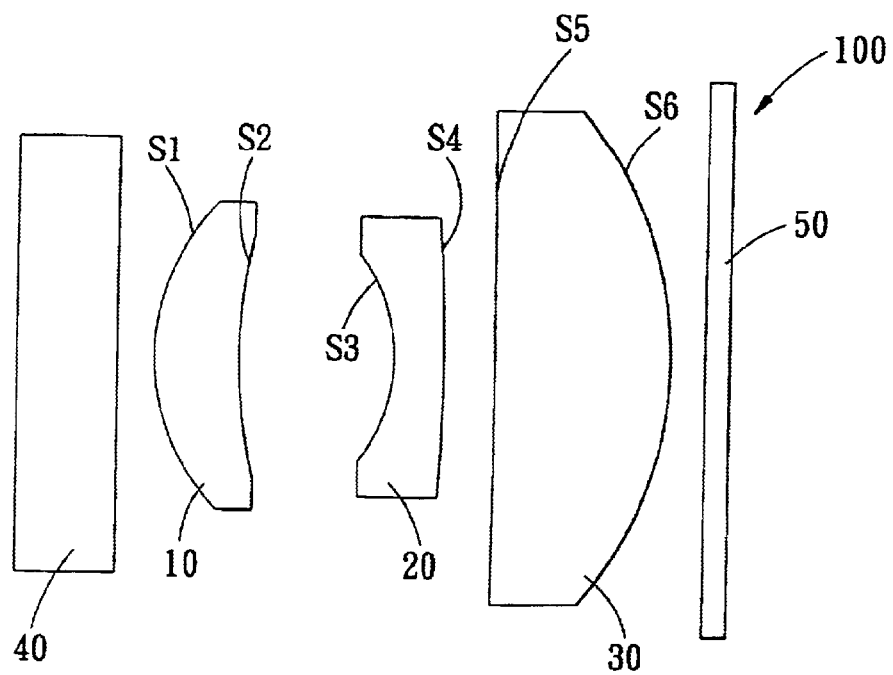
F I G. 5
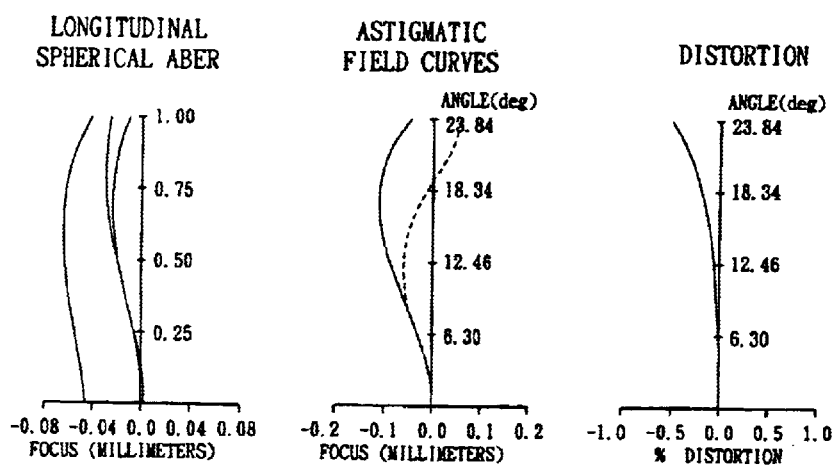
F I G. 6

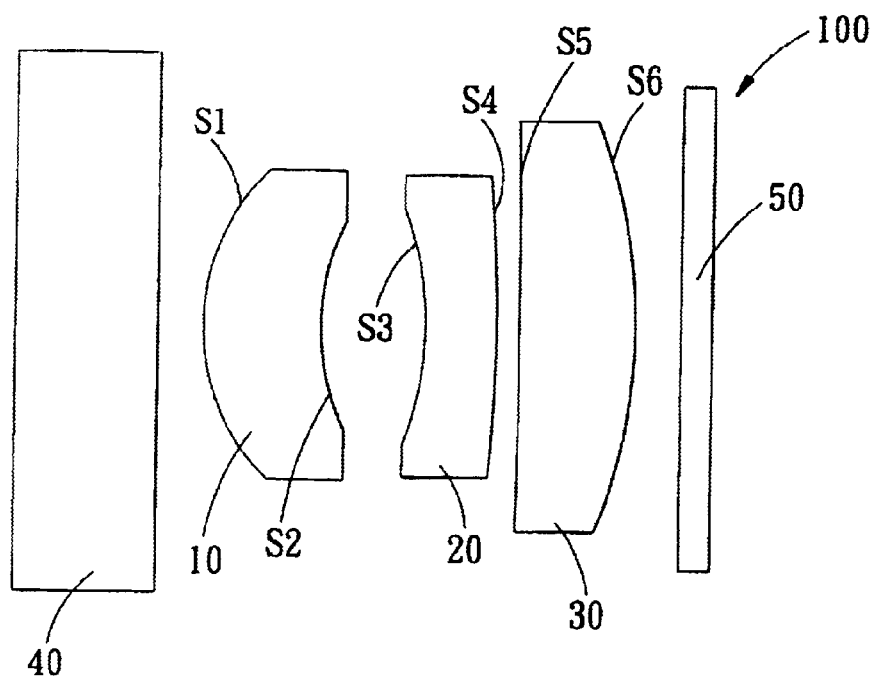
F I G. 7
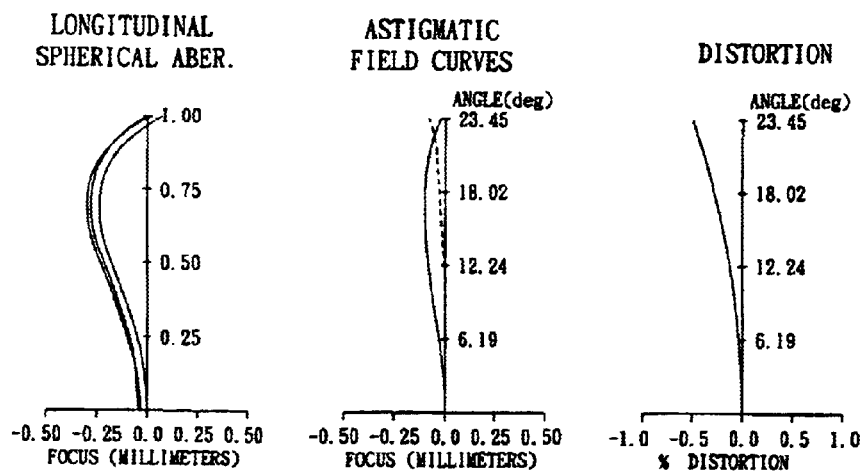
F I G. 8

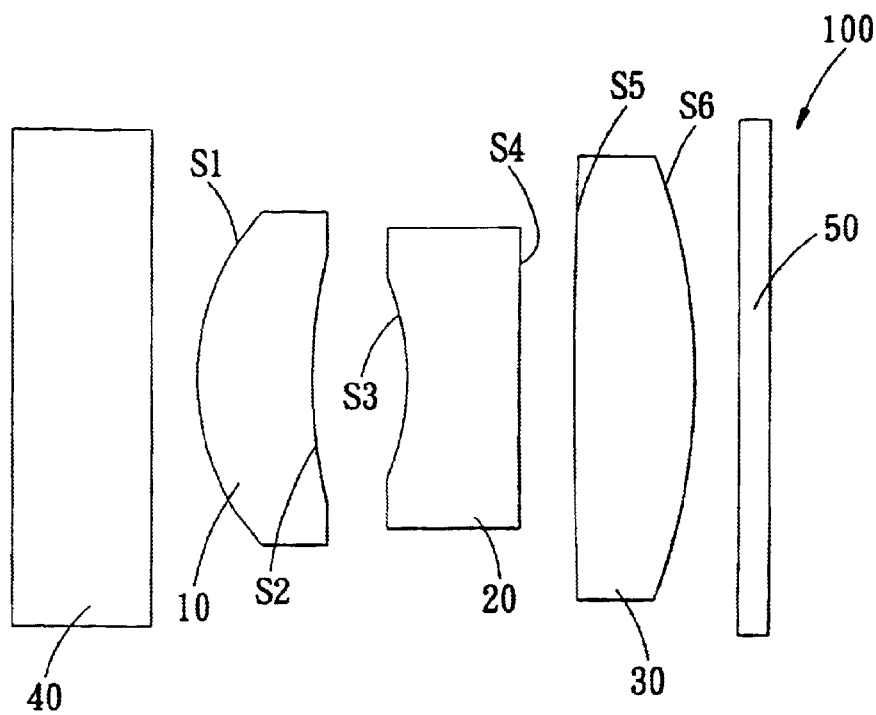
F I G. 9
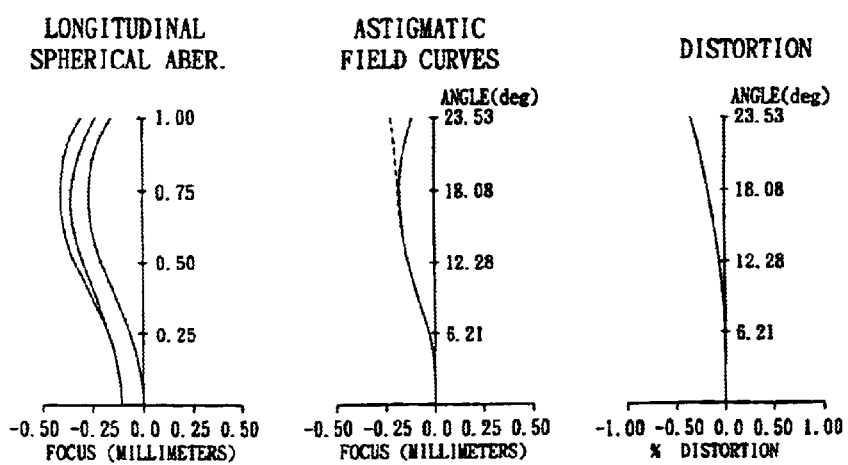
F I G. 10

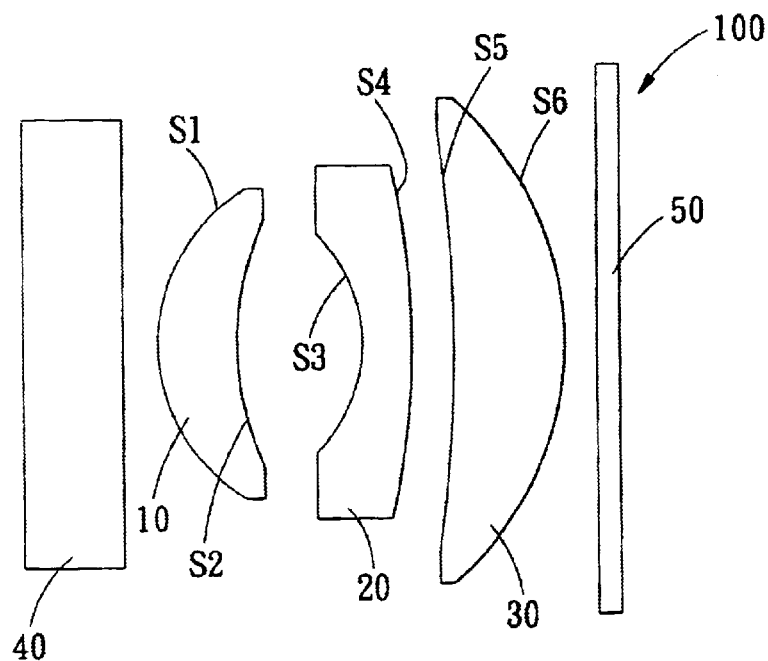
F I G. 11
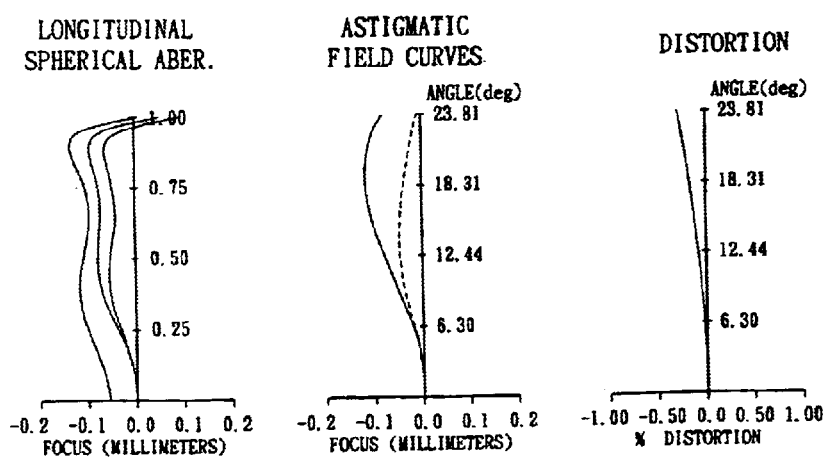
F I G. 12

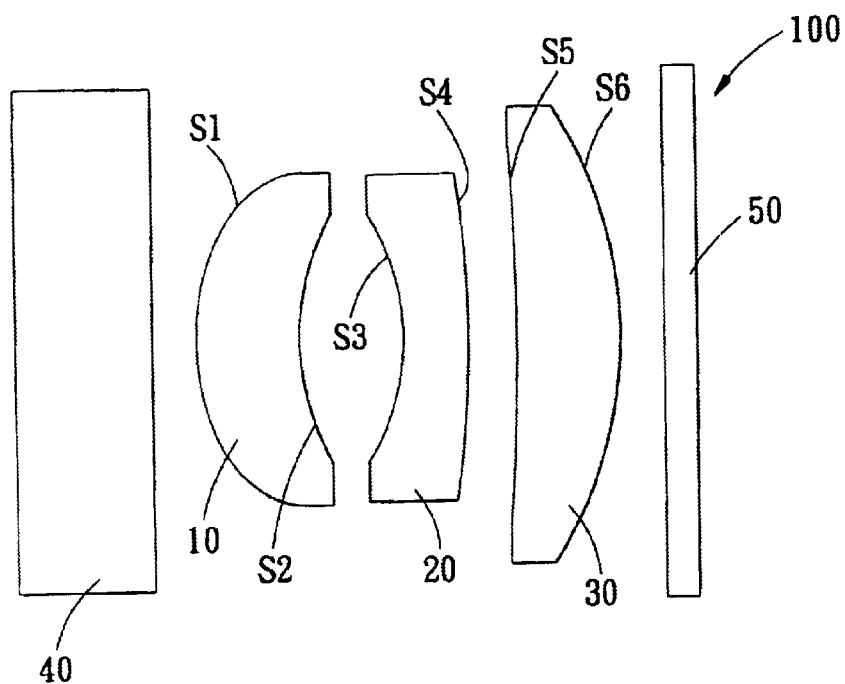
F I G. 15
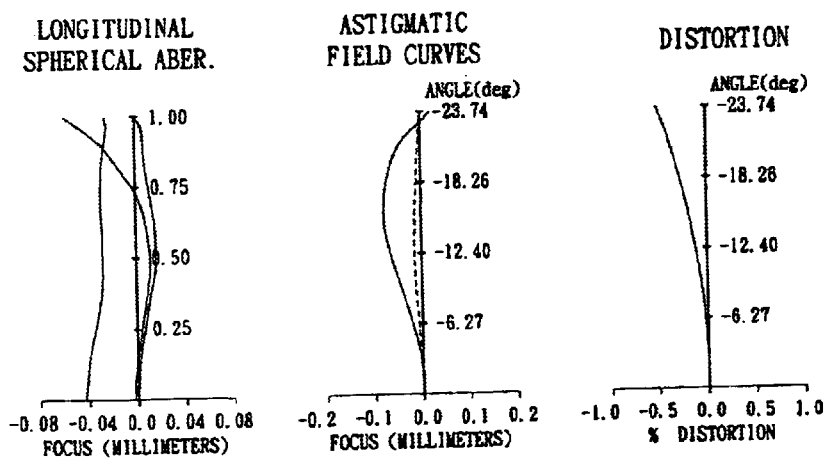
F I G. 16

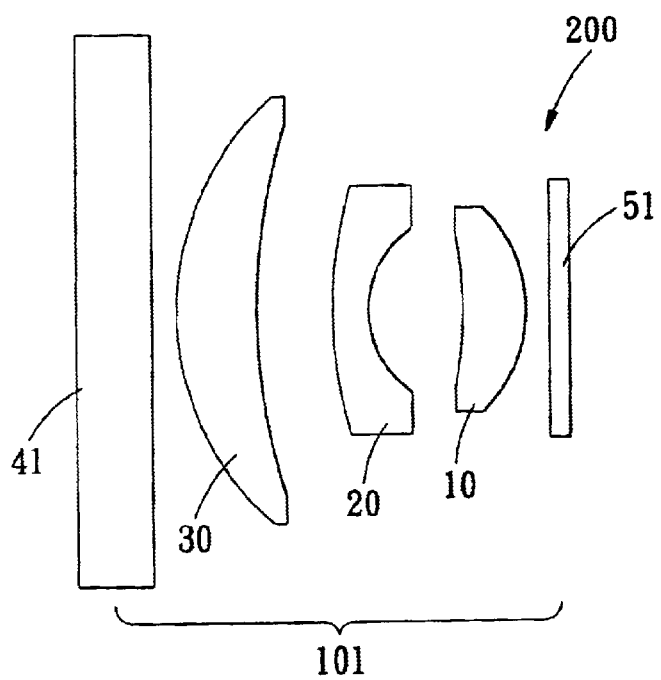
F I G. 17
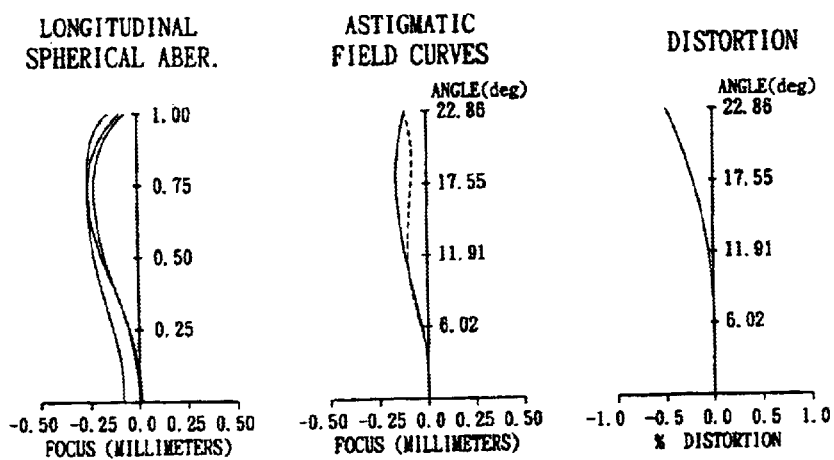
F I G. 18

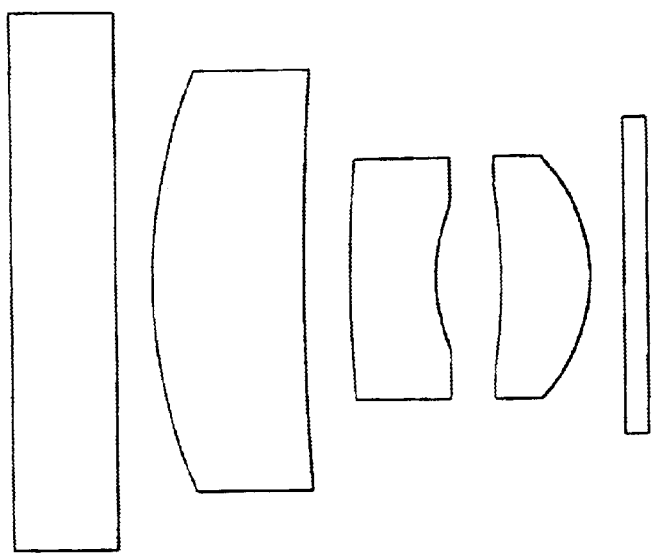
F I G. 19
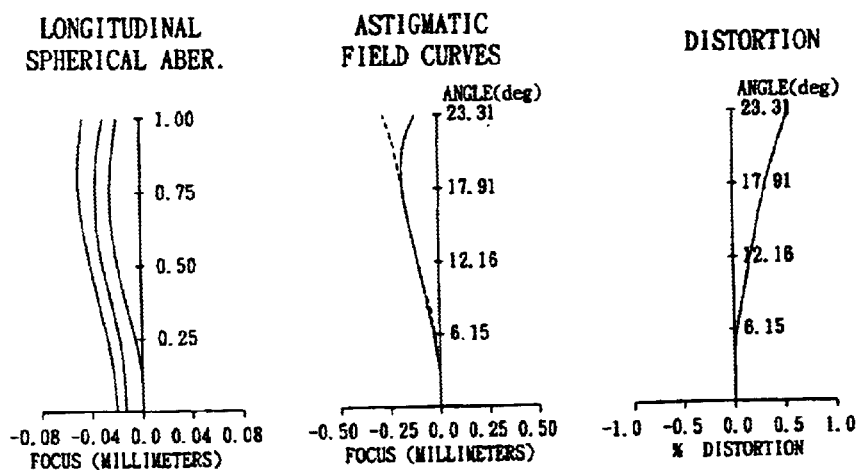
F I G. 20

HYBRID LENS SYSTEM

FIELD OF THE INVENTION

The present invention relates to a triplet lens system composed of three lenses each having reflective powers and a diffractive surface and an aspheric surface are mounted on pre-set lenses so as to have better image with lower manufacturing cost.

BACKGROUND OF THE INVENTION

An image reading device generally consists of three glass spherical lens which includes a meniscus lens, a bi-concave lens and a bi-convex lens arranged in a specific sequence. The optical arrangement is called Cook-Triplet system. However, the glass lens system is suffered with high manufacturing cost that refrains from number of elements of glass lenses. The spherical surface of the glass lenses cannot get rid of image aberration when the aperture and the field angle are increased. This limits the resolution of the conventional triplets lens system.

The use of the plastic lenses may be considered as a solution to the above-mentioned problems.

SUMMARY OF THE INVENTION

In accordance with the present invention, the lens system comprises three lenses juxtaposed with each other and each of which has refractive power. The first lens is a plastic lens having a front side formed with a convex surface which has a radius of curvature of R1, and a rear side formed with a concave surface which has a radius of curvature of R2, wherein $|R1|<|R2|$.

The second lens is a plastic lens having a front side formed with a convex surface. A shape coefficient $X2=((R1+R2)/(R2-R1))$ is larger than 0.9. When the front side is a convex surface, R1>0. When the front side is a concave surface, R1<0. When the rear side is a concave surface, R2>0. When the rear side is a convex surface, R2<0.

The third lens is a glass lens having positive refractive power. An aspheric surface and a diffractive surface are respectively mounted on the plastic lenses.

The primary object of the present invention is to provide a lens system that can be obtained with low manufacturing cost. A diffractive surface and an aspheric surface are mounted on the plastic lenses. By this way, the optical system can be manufactured by plastic lenses which are made by injection molding of an injection machine is considered to decrease the cost, easier to be produced into aspheric surface or diffractive surface.

The other object of the present invention is to provide a lens system made of plastic material which has more controllable factors so as to eliminate the image aberration and chromatic aberration in glass lenses.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a plan view to show the first embodiment of the lens system in accordance with the present invention;

FIG. 2 is a longitudinal spherical aberration curve, an astigmatic field curve, and a distortion curve of the first embodiment of the present invention;

FIG. 5 is a plan view to show the fourth embodiment of the lens system in accordance with the present invention;

FIG. 6 is a longitudinal spherical aberration curve, an astigmatic field curve, and a distortion curve of the fourth embodiment of the present invention;

FIG. 7 is a plan view to show the fifth embodiment of the lens system in accordance with the present invention;

FIG. 8 is a longitudinal spherical aberration curve, an astigmatic field curve, and a distortion curve of the fifth embodiment of the present invention;

FIG. 9 is a plan view to show the fifth embodiment of the lens system in accordance with the present invention;

FIG. 10 is a longitudinal spherical aberration curve, an astigmatic field curve, and a distortion curve of the fifth embodiment of the present invention;

FIG. 11 is a plan view to show the sixth embodiment of the lens system in accordance with the present invention;

FIG. 12 is a longitudinal spherical aberration curve, an astigmatic field curve, and a distortion curve of the sixth embodiment of the present invention;

FIG. 15 is a plan view to show the eighth embodiment of the lens system in accordance with the present invention;

FIG. 16 is a longitudinal spherical aberration curve, an astigmatic field curve, and a distortion curve of the eighth embodiment of the present invention;

FIG. 17 is a plan view to show the ninth embodiment of the lens system in accordance with the present invention;

FIG. 18 is a longitudinal spherical aberration curve, an astigmatic field curve, and a distortion curve of the ninth embodiment of the present invention;

FIG. 19 is a plan view to show the tenth embodiment of the lens system in accordance with the present invention, and FIG. 20 is a longitudinal spherical aberration curve, an astigmatic field curve, and a distortion curve of the tenth embodiment of the present invention.

DETAILED DESCRIPTION OF THE PREFERRED EMBODIMENTS

Figure 3:
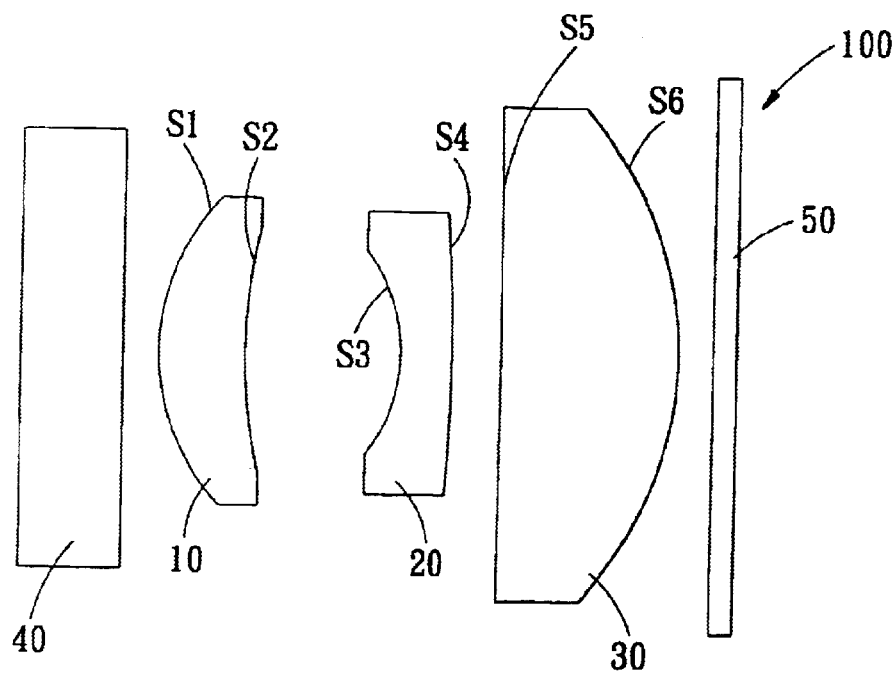
FIG. 3 is a plan view to show the second embodiment of the lens system in accordance with the present invention.

Referring to FIGS. 1 and 2 and attachment 1, a first embodiment of the present invention, the optical lens system 100 comprises three juxtaposed lenses 10, 20 and 30. Two plate glasses 40 and 50 are located on the front side ant the rear side of the system 100, wherein the two plate glasses 40 and 50 do not affect the focal length of the system 100. The first lens 10 is a positive lens made of plastic having a front side formed with a convex surface S1 and a rear side formed with a concave surface S2. The second lens 20 is a negative lens made of plastic having a front side formed with a concave surface S3 and a rear side formed with a convex surface S4. The third lens 30 is a positive lens made of glass having a front side formed with a concave surface S5 and a rear side formed with a convex surface S6. Aspheric surfaces or diffractive surfaces are built on the lenses 10 and 20.

Because that the two plate glasses 40 and 50 respectively located at the front and rear sides of the system and which are ineffective to the focal length of the lens system, the image can be controlled at the aspheric surfaces of the first lens 10, the second lens 20 and the third lens 30. The aspheric surfaces and the diffractive surface can provide the system 100 more controllable factors so as to accommodate the image aberration and increase the ability of resolution of the system 100.

The equation for aspheric surface is expressed as below:

$$X(Y)=(Y^2/R)/(1+\mathrm{sqrt}(1-(1+K)\times(Y/R)^2))+A_4\times Y^4+A_6\times Y^6+\ldots$$

Wherein,

X is the height of the cross section on the lens.

Y is the height from the optical axis.

K is the conic coefficient.

$A_4, A_6, \ldots$, are the aspheric coefficients of $4^{th}, 6^{th}, \ldots$ order.

The equation for a phase difference of the diffractive surface is expressed as below:

$$Ph(Y)=2\times\pi/(WL)\times(C_1\times Y^2+C_2\times Y^4+\ldots)$$

Where,

Y is the distance from a point on the lens to the optical axis.

WL is the reference wavelength.

$C_1, C_2, \ldots$ is the aspheric phase coefficient of $2^{nd}, 4^{th}, \ldots$ order.

The first re-arrangement mode of the system is similar to the first embodiment of the system 100, and arranges as positive-negative-positive arrangement, in other words, the P-P-G arrangement. The first conventional glass made meniscus positive lens is replaced with a plastic meniscus positive lens. The second conventional glass made bi-concave negative lens is replaced with a plastic meniscus negative lens with a front concave surface. The third conventional glass made bi-convex positive lens is replaced with a plastic meniscus positive lens with a front concave surface. At least one aspheric surface is mounted on the plastic lens of the system 100, and a diffractive surface is mounted to the first lens. The focal lengths of the first lens, the second lens, the system meets the following requirement:

The first lens 10 meets the requirement: R1<R2

The radius of curvature of the front side S1 is R1.

The radius of curvature of the rear side S2 is R2.

The shape coefficient X of the second lens 20 is larger than 0.9.

The shape coefficient X=(R1+R2)/(R2−R1)

The radius of curvature of the front side S3 is R1.

The radius of curvature of the rear side S4 is R2.

The third lens 30: R1 is minus and R2 is minus.

The radius of curvature of the front side S5 is R1.

The radius of curvature of the rear side S6 is R2.

The first lens 10 is made of lower color diffusion plastic material which can be PMMA or COC. The second lens 20 is made of high color diffusion plastic material which can be PS, PC or MS. The third lens 30 is made of low color diffusion glass material. The aperture is allocated between the two plastic lenses which are meniscus lenses. The two respective concave surfaces of the two plastic lenses face to each other so as to get larger field angle. The aspheric surface mounted on the plastic lens can overcome the image aberration of the spherical surface. In addition, a diffractive mask (diffractive surface) may be mounted onto the plastic lens so as to overcome the chromatic aberration. Accordingly, the present invention has better feature than that of the conventional arrangement.

It is to be noted that the reflective rate of the plastic material is lower than that of the glass, the shape coefficient X1 of the first lens meets the following requirement so as to increase the diffraction of the single lens.

1. X1>2.0

2. When the font side of the lens is a convex surface, the radius of curvature R1>0, when the rear side of the lens is a convex surface, the radius of curvature R1<0.

3. To control the refractive power P1 of the first lens, the refractive power P2 of the second lens, the combined power P12 of the two lenses, the refractive power P3 of the third lens, the refractive power Pd of the diffractive grating, and the total refractive power P of the system to meet the following requirements:

(P1/P2)>−1.0

0>(P12/P1)>−0.8

0.2>(Pd/P12)>−0.4

0.05>(P12/P3)>−0.55

0.2>(P12/P)>−0.1

After being arranged as mentioned above, the present invention obtains better images.

Referring to FIGS. 1, 2 and attachment 1, which show the first embodiment of the present invention, wherein

X1=3.77

X2=1.72

P1/P2=−0.52

P12/P1=−0.42

P12/P3=−0.45

Pd/P12=−0.11

Figure 4:
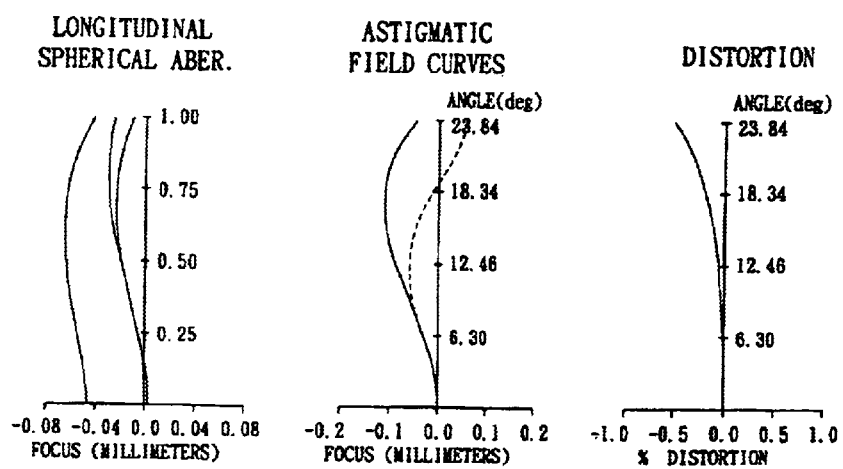
FIG. 4 is a longitudinal spherical aberration curve, an astigmatic field curve, and a distortion curve of the second embodiment of the present invention.

Referring to FIGS. 3, 4 and attachment 2, which show the second embodiment of the present invention, wherein

X1=2.91

X2=1.4

P1/P2=−0.48

P12/P1=−0.43

P12/P3=−0.28

Pd/P12=−0.11

P12/P=−0.53

Pd/P12=−0.07

Referring to FIGS. 5, 6 and attachment 3, which show the third embodiment of the present invention, wherein

X1=12.2

X2=1.46

P1/P2=−0.51

P12/P1=−0.51

P12/P3=−0.26

P12/P=−0.45

Pd/P12=−0.1

Referring to FIGS. 7, 8 and attachment 4, which show the fourth embodiment of the present invention, wherein

X1=3.22

X2=0.9

P1/P2=−0.62

P12/P1=−0.21

P12/P3=−0.18

P12/P=−0.28

Pd/P12=−0.52

Referring to FIGS. 9, 10 and attachment 5, which show the fifth embodiment of the present invention, wherein X1=4.07
X2=1.66
P1/P2=−0.51
P12/P1=−0.41
P12/P3=−0.25
P12/P=−0.48
Pd/P12=−0.13

Referring to FIGS. 11, 12 and attachment 6, which show the sixth embodiment of the present invention, wherein X1=4.55
X2=1.83
P1/P2=−0.53
P12/P1=−0.42
P12/P3=−0.25
P12/P=−0.44
Pd/P12=−0.14

Figure 13:
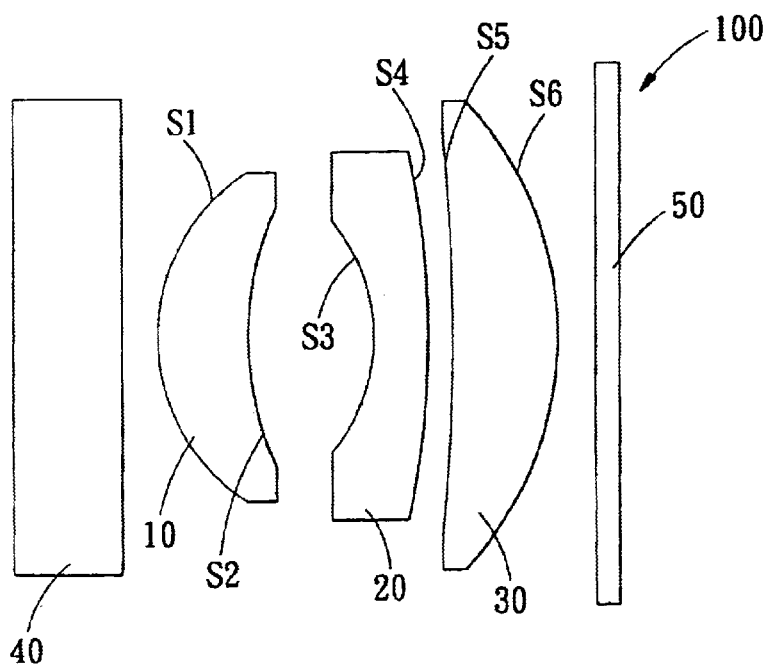
FIG. 13 is a plan view to show the seventh embodiment of the lens system in accordance with the present invention.
Figure 14:
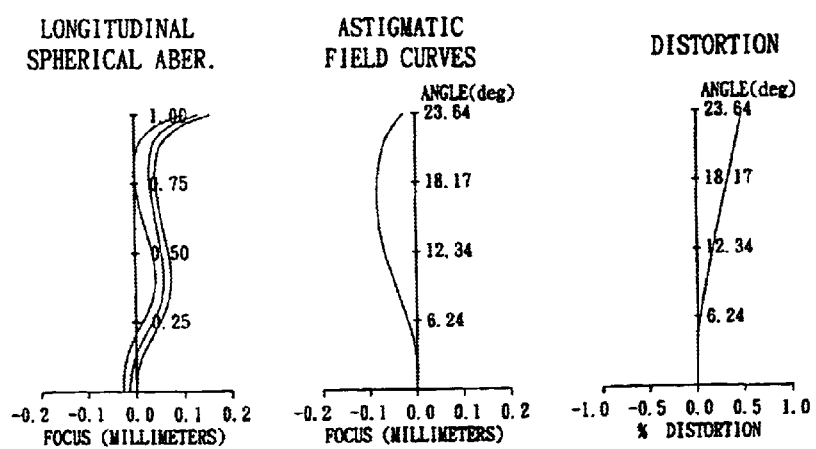
FIG. 14 is a longitudinal spherical aberration curve, an astigmatic field curve, and a distortion curve of the seventh embodiment of the present invention.

Referring to FIGS. 13, 14 and attachment 7, which show the seventh embodiment of the present invention, wherein X1=4.31
X2=1.61
P1/P2=−0.51
P12/P1=−0.43
P12/P3=−0.26
P12/P=−0.49
Pd/P12=−0.07

Referring to FIGS. 15, 16 and attachment 8, which show the eighth embodiment of the present invention, wherein X1=6.37
X2=1.73
P1/P2=−0.51
P12/P1=−0.56
P12/P3=−0.31
P12/P=−0.55
Pd/P12=−0.07

The second re-arrangement mold which is the ninth embodiment of the present invention is shown in FIGS. 17, 18 and attachment 9. The present invention can employ front-rear reverse optical system 200 and the arrangement is allocated as G-P-P. The shapes of the respective lenses are reverse. The reverse optical system 101 has two plate glasses 41, 51 which are located at the front side and the rear side and do not affect the focal length of the system. The plastic lenses has the following characters:

X2<−0.9
−1.0>X3>−20
(P3/P2)>−1.0
0.3>(P23/P3)>−0.3
4.0>(Pd/P23)>−1.0 wherein,
X2 is the shape coefficient of the second lens.
X3 is the shape coefficient of the third lens.
P3 is the refractive power of the third lens.
P2 is the refractive power of the second lens.
P23 is the combined refractive power of the second lens and the third lens.
Pd is the refractive power of the diffraction grating.

Referring to FIGS. 17, 18 and attachment 9, which show the ninth embodiment of the present invention, wherein X2=−1.86
X3=−2.23
P3/P2=−0.73
P23/P3=0.1
P23/P1=0.126
P23/P=0.169
Pd/P23 −0.263

Referring to FIGS. 19, 20 and attachment 10, which show the tenth embodiment of the present invention, wherein X2=−1.41
X3=−2.5
P3/P2=−0.86
P23/P3=0.117
P23/P1=0.167
P23/P=0.189
Pd/P23=0.828

The present invention employs plastic positive lens, plastic negative lens and glass positive lens to be a hybrid optical lens system. The plastic lenses are shaped as meniscus lenses and an aspheric surface and a diffractive surface are respectively mounted onto the plastic lenses so that the optical system of the present invention has better feature with low manufacturing cost.

While we have shown and described various embodiments in accordance with the present invention, it should be clear to those skilled in the art that further embodiments may be made without departing from the scope and spirit of the present invention.

What is claimed is:

1. A lens system comprising:

three lenses juxtaposed with each other and each having refractive power, a first one of the three lenses serving with positive refractive power being a plastic lens having a front side formed with a convex surface having a radius of curvature of R1 and a rear side formed with a concave surface having a radius of curvature of R2, and |R1|<|R2|;

a second one of the three lenses serving with negative refractive power being a plastic lens having a front side formed with a concave surface, a shape coefficient X2=((R1+R2)/(R2−R1)) being larger than 0.9;

a third one of the three lenses serving with positive refractive power being a glass lens having positive refractive power;

the refractive power of the first lens, the refractive power of the second lens, and a combining refractive power of the first and second lens meet the following requirements:

(P1/P2)>−1.0
0>(P12/P1)>0.8 wherein
P1: the refractive power of the first lens;
P2: the refractive power of the second lens;
P12: the combining refractive power of the first and second lens;
the shape coefficient of a lens being define as Xi=(R1+R2)/(R2−R1), wherein i ranges from 1 to 3 and refers to the first to the third lenses, R1 being the radius of curvature of front surface of lens, R2 being the radius of curvature of the rear surface of lens, and R1>0 as the front surface being convex, R1<0 as the front surface being concave, R2<0 as the rear surface being convex, R2>0 as the rear surface being concave;

at least one diffractive surface being formed on at least one of the plastic lens of the three lenses, and at least one aspheric surface being formed on at least one of the plastic lens of the three lenses.

2. The lens system in accordance with claim 1, wherein the rear side of the second lens is a convex surface.

3. The lens system in accordance with claim 2, wherein the shape coefficient X1 of the first lens is larger than 2.0.

4. The lens system in accordance with claim 1, wherein the combining refractive power of the first and second lens and the refractive power of diffractive grating meet the following requirements:

0.2>(Pd/P12)>−0.4 wherein
Pd: the refractive power of the diffractive grating; Pd=(C1)×(−2), wherein C1 is the aspheric phase coefficient of second lens;
P12: the combined refractive power of the first lens and the second lens.

5. The lens system in accordance with claim 4, wherein the combining refractive power of the first and second lens, the refractive power of the third lens, and the refractive power of the three lens system meet the following requirements:

0.05>(P12/P3)>−0.55

0.2>(P12/P)>−1.0 wherein
P12: the combining refractive power of the first lens and the second lens
P3: the refractive power of the third lens
P: the refractive power of the three lens system.

6. A lens system comprising:

three lenses juxtaposed with each other and each having refractive power, wherein
a first one of the three lenses serving with positive refractive power being a plastic lens;
a second one of the three lenses serving with negative refractive power being a plastic lens and having a front side formed with a concave surface and a shape coefficient X2 being larger than −0.9;
a third one of the three lenses serving with positive refractive power being a glass lens and having a front side formed with a concave surface and a rear side formed with a convex surface, and the shape coefficient X3 being located with a range between −0.1 to −2.0;
at least one diffractive surface being formed on at least one of the plastic lens of the three lenses, and
at least one aspheric surface being formed on at least one of the plastic lens of the three lens.

7. The lens system in accordance with claim 6, wherein the front side of the second lens is a convex surface.

8. The lens system in accordance with claim 6, wherein the refractive power of the second lens, the refractive power of the third lens, and the combining refractive power of the second lens and the third lens, meet the following requirements:

(P3/P2)>−0.1

0.3>(P23/P3)>−0.3 wherein
P2: the refractive power of the second lens;
P3: the refractive power of the third lens
P23: the combining refractive power of the second and the third lens.

9. The lens system in accordance with claim 8, wherein the combining refractive power of the second lens and the third lens, and the refractive power of diffractive grating, meet the following requirements:

(Pd/P23)>0.1 wherein
P23: the combining refractive power of the second and the third lens.
Pd: the refractive power of the diffractive grating.

* * * * *